(12) United States Patent
Kurtz

(10) Patent No.: US 8,412,442 B2
(45) Date of Patent: Apr. 2, 2013

(54) METHOD OF ENGINE STARTING

(75) Inventor: Eric Kurtz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/619,602

(22) Filed: Sep. 14, 2012

(65) Prior Publication Data

US 2013/0008418 A1 Jan. 10, 2013

Related U.S. Application Data

(63) Continuation of application No. 13/165,487, filed on Jun. 21, 2011, now Pat. No. 8,301,358.

(51) Int. Cl.
*F02B 47/08* (2006.01)
*F01N 3/18* (2006.01)

(52) U.S. Cl. .............. 701/108; 123/568.11; 123/568.22; 123/568.31; 60/284; 60/285; 60/288; 60/300; 60/303; 60/320

(58) Field of Classification Search .................. 701/108; 60/284, 285, 288, 300, 303, 320; 123/568.11, 123/568.21, 568.22, 568.31
See application file for complete search history.

(56) References Cited

U.S. PATENT DOCUMENTS

| | | | |
|---|---|---|---|
| 5,265,418 A * | 11/1993 | Smith | 60/284 |
| 5,545,928 A | 8/1996 | Kotani | |
| 6,059,057 A * | 5/2000 | Yamazaki et al. | 180/65.235 |
| 6,321,530 B1 * | 11/2001 | Hoshi et al. | 60/274 |
| 6,470,985 B1 | 10/2002 | Inada et al. | |
| 6,829,888 B2 | 12/2004 | Kuenstler et al. | |
| 7,007,460 B2 | 3/2006 | Frieden et al. | |
| 7,370,470 B2 | 5/2008 | Graupner et al. | |
| 7,458,203 B2 | 12/2008 | Pott | |
| 7,584,607 B2 | 9/2009 | Samuelsen et al. | |
| 7,654,079 B2 * | 2/2010 | Ruth et al. | 60/286 |
| 8,042,326 B2 | 10/2011 | Farell et al. | |
| 2002/0124554 A1 | 9/2002 | Majima | |
| 2006/0241826 A1 | 10/2006 | Ishishita et al. | |
| 2009/0133391 A1* | 5/2009 | Porten et al. | 60/303 |
| 2010/0126142 A1 | 5/2010 | Murata et al. | |
| 2010/0256895 A1 | 10/2010 | Harada | |

* cited by examiner

*Primary Examiner* — Erick Solis
(74) *Attorney, Agent, or Firm* — Julia Voutyras; Alleman Hall McCoy Russell & Tuttle LLP

(57) ABSTRACT

An engine starting method is disclosed. In one example, engine operation is adjusted to reduce catalyst light off time. Exhaust temperatures may be increased until a threshold engine temperature is reached.

17 Claims, 5 Drawing Sheets

METHOD OF ENGINE STARTING

CROSS REFERENCE TO RELATED APPLICATIONS

The present application is a continuation of U.S. patent application Ser. No. 13/165,487 filed Jun. 21, 2011, the entire contents of which are incorporated herein by reference for all purposes.

BACKGROUND/SUMMARY

Diesel engines can provide high torque and improved fuel economy as compared to gasoline engines. However, the temperature of diesel exhaust gases is lower than that of many gasoline engines. Therefore, it may take longer for catalysts in an exhaust system of the diesel engine to reach a temperature where a threshold catalyst efficiency temperature is reached (e.g., a catalyst light off temperature). Further, many diesel engine are turbocharged to improve engine output, and exhaust gas heat is extracted by the turbocharger. Consequently, even less exhaust gas heat may be available to light off the catalyst. In view of exhaust gas heating challenges associated with diesel engines, it may be desirable to provide for a way to improve diesel engine starting.

The inventor herein has recognized the above-mentioned disadvantages and has developed an engine operating method, comprising: operating an engine at idle conditions with a first EGR percent concentration at an engine temperature less than a first engine temperature; and operating the engine at idle conditions with a second EGR percent concentration at an engine temperature greater than the first engine temperature, the second EGR percent concentration less than the first EGR percent concentration.

By operating an engine after a cold engine start with a higher level of exhaust gas recirculation (EGR) than is delivered during similar warm engine operating conditions, it may be possible to increase engine exhaust gas temperatures to reduce catalyst light off time. Further, increasing EGR and retarding combustion phasing (e.g., location of peak cylinder pressure) can increase engine temperature in a reduced amount of time. Consequently, engine emissions may be reduced. In one example, engine speed and load may be increased via a hybrid powertrain to allow higher levels of EGR at engine idle conditions. The higher levels of EGR at idle can retard combustion timing so as to direct more combustion heat to the engine and engine exhaust system. One way to achieve higher engine loads and increase tolerance to higher percentages of EGR in cylinder mixtures is to utilize an auxiliary motor of a hybrid vehicle. For example, an electric motor can be used to control engine speed and engine load during engine idle conditions.

The present description may provide several advantages. In particular, the approach may reduce catalyst light off time, thereby reducing engine emissions. Further, the approach reduce engine warm up time so as to reduce engine feed gas emissions. Further still, the approach can provide good vehicle drivability via ramping out EGR and combustion phase retard during conditions where engine torque demand increases.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
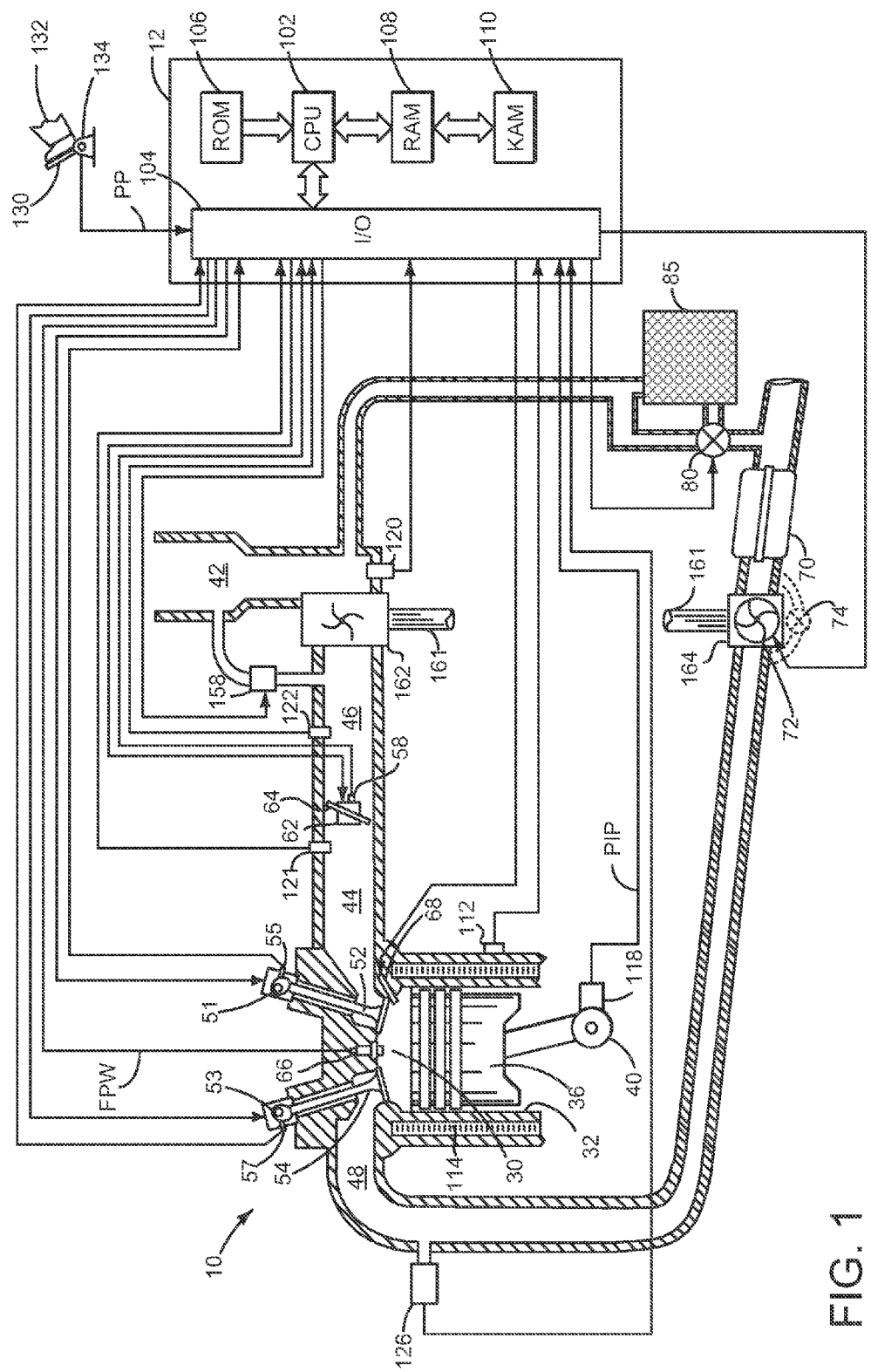
FIG. 1 shows a schematic depiction of an engine.
Figure 2:
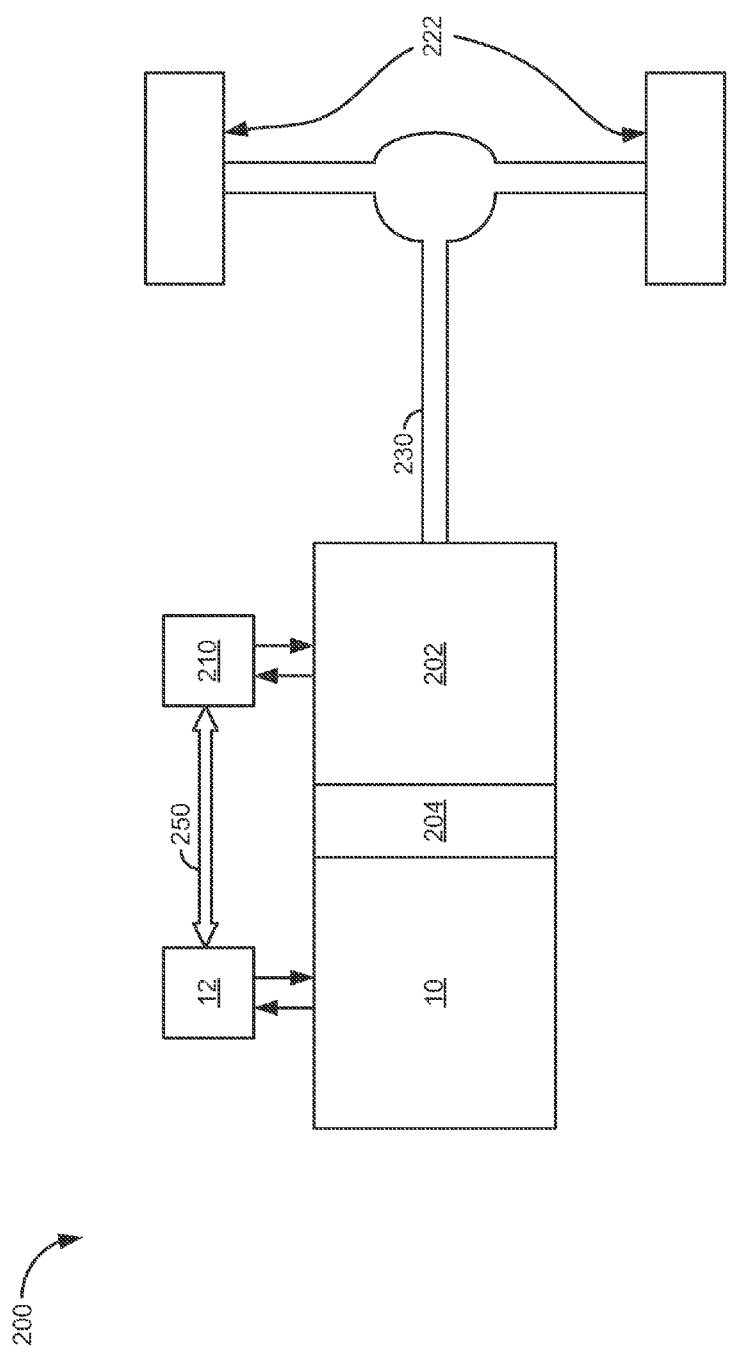
FIG. 2 shows example hybrid powertrain including the engine of FIG. 1.
Figure 3:
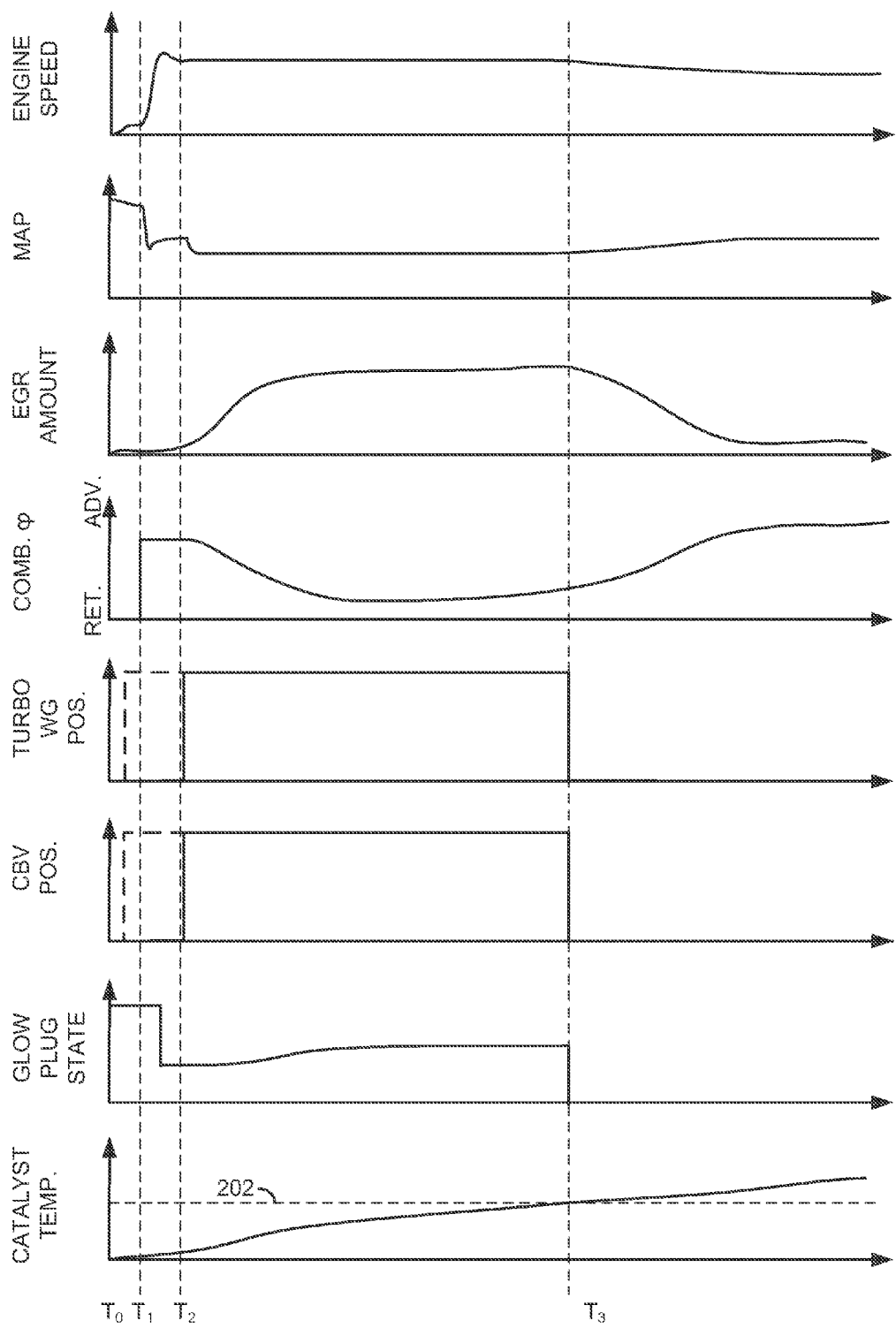
FIGS. 3-4 show signals of interest during two different engine starting sequences.
Figure 4:
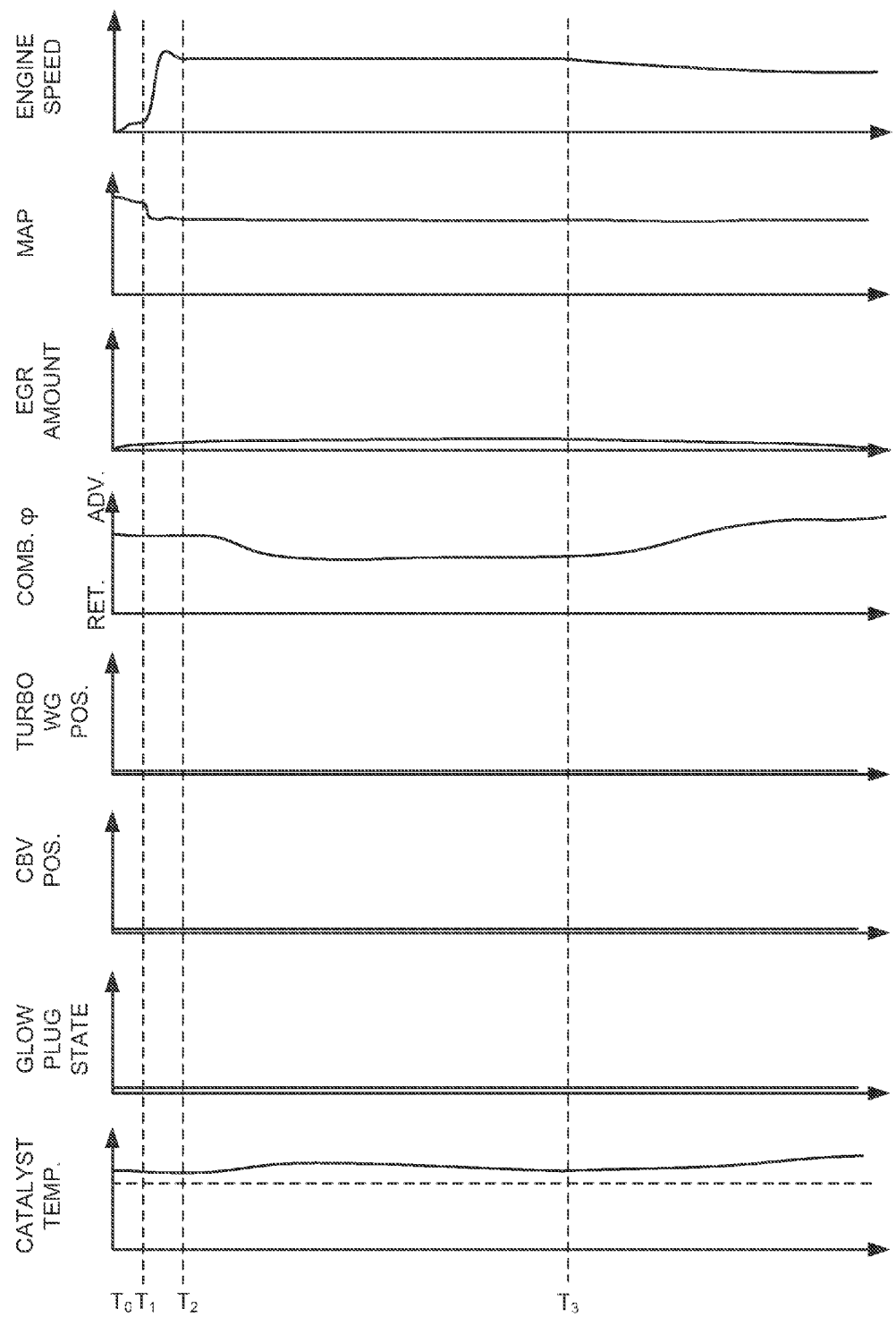
Figure 5:
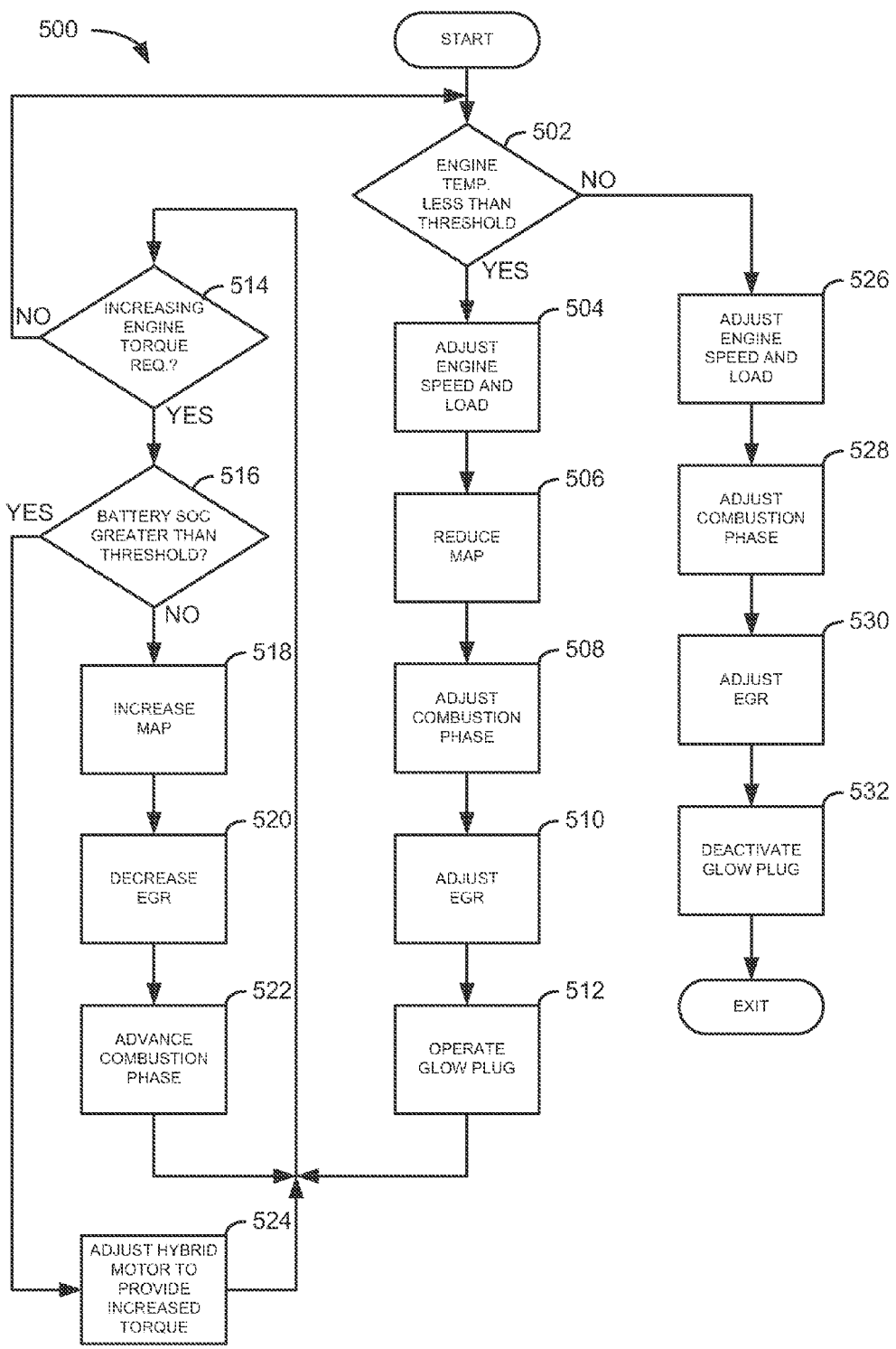
FIG. 5 shows a flowchart of an example method for starting an engine.

The present description is related to improving engine starting. FIG. 1 shows one example of a boosted diesel engine where the method of FIG. 5 may adjust EGR, intake manifold pressure, glow plug operation, and combustion phasing to improve engine starting and reduce engine emissions. FIG. 2 shows an example powertrain including the engine shown in FIG. 1. FIGS. 3 and 4 show signals of interest during two different engine starting sequences. FIG. 5 shows a flowchart of an example method for starting an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into combustion chamber 30, which is known to those skilled in the art as direct injection. Fuel injector 66 delivers fuel in proportion to the pulse width of signal FPW from controller 12. Fuel is delivered to fuel injector 66 by a fuel system (not shown) including a fuel tank, fuel pump, fuel rail (not shown). Fuel pressure delivered by the fuel system may be adjusted by varying a position valve regulating flow to a fuel pump (not shown). In addition, a metering valve may be located in or near the fuel rail for closed loop fuel control.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. In some examples, a charge air cooler may be provided. Compressor speed may be adjusted via adjusting a position of variable vane control 72 or compressor bypass valve 158. In alternative examples, a waste gate 74 may replace variable vane control 72. Variable vane control 72 adjusts a position of variable geometry turbine vanes. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 74 allows exhaust gases to flow around turbine 164 so as to reduce the amount of energy supplied to the turbine. Compressor bypass valve 158 allows compressed air at the outlet of compressor 162 to be returned to the input of compressor 162. In this way, the efficiency of compressor 162 may be reduced so as to affect the flow of compressor 162 and reduce intake manifold pressure.

Combustion is initiated in combustion chamber 30 when fuel automatically ignites as piston 36 approaches top-dead-center compression stroke. In some examples, a universal Exhaust Gas Oxygen (UEGO) sensor (not shown) may be coupled to exhaust manifold 48 upstream of emissions device 70. In other examples, the UEGO sensor may be located downstream of one or more exhaust after treatment devices. Further, in some examples, the UEGO sensor may be replaced by a NOx sensor.

At lower engine temperatures glow plug 68 may convert electrical energy into thermal energy so as to raise a temperature in combustion chamber 30. By raising the combustion temperature of combustion chamber 30, it may be easier to ignite a cylinder air-fuel mixture via compression.

Emissions device 70 can include a particulate filter and catalyst bricks, in one example. In another example, multiple emission control devices, each with multiple bricks, can be used. Emissions device 70 can include an oxidation catalyst in one example. In other examples, the emissions device may include a lean NOx trap or an SCR.

EGR may be provided to the engine via EGR valve 80. EGR valve 80 is a three-way valve that closes or allows exhaust gas to flow from downstream of emissions device 70 to a location in the engine air intake system upstream of compressor 162. In alternative examples, EGR may flow from upstream of turbine 164 to intake manifold 44. EGR may bypass EGR cooler 85, or alternatively, EGR may be cooled via passing through EGR cooler 85. In other, examples high pressure and low pressure EGR system may be provided.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 121 coupled to intake manifold 44; boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle as shown in FIG. 2. The hybrid vehicle may have a parallel configuration, series configuration, or variation or combinations thereof.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by compression ignition or by known ignition means such as spark plug (not shown), resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Referring now to FIG. 2 an example hybrid powertrain including the engine of FIG. 1 is shown. Hybrid powertrain 200 includes an engine 10 and engine controller 12 as is described in FIG. 1. Hybrid powertrain 200 also includes an electric motor 202 and motor controller 210. Engine controller 12 may communicate with motor controller 210 via communication link 250. In one example, communication link 250 is a CAN link. Electric motor 202 is shown mechanically coupled to engine 10 via transmission 204. Driveshaft 230 mechanically couples electric motor 202 to vehicle wheels 222. Electric motor 202 and engine 10 may provide torque to vehicle wheels 222 solely or together. Vehicle wheels 222 may be front wheels or rear wheels of the vehicle. In other examples, the engine and electric motor may be mechanically coupled in an alternative way.

Thus, the systems of FIGS. 1 and 2 provide for an engine system, comprising: an engine; an EGR valve in pneumatic communication with the engine; a glow plug coupled to the engine; a controller, the controller including instructions to operate the engine at idle conditions with the EGR valve at a first EGR valve position when the engine is operated at a first engine temperature, the controller including instructions to operate the engine at idle conditions with the EGR valve at a second EGR valve position when engine temperature is at an engine temperature greater than the first engine temperature, the second EGR valve position opened less than the first EGR valve position, the controller including further instructions to heat a combustion chamber of the engine after a start via the glow plug when a temperature of the engine is less than the first engine temperature. It should be noted that engine idle conditions may vary with engine temperature. For example, when an engine is operated at lower engine temperatures the idle speed may be elevated by 200 RPM from when the engine is operated at warm idle. Further, engine load may be increased at idle when the engine is operated at a lower temperature. Engine idle conditions can include where there is substantially no operator demand and when the vehicle that is propelled by the engine is stationary. In one example, the engine outputs substantially equivalent mechanical torque during warm and cold idle, but the engine is operated at higher speed and load during cold conditions. The additional energy from combustion at cold conditions is converted to exhaust heat rather than mechanical energy. The engine system further comprises additional controller instructions for decreasing a tip temperature of the glow plug as the first EGR percent concentration decreases. The engine system further comprises additional controller instructions for opening a compressor bypass valve when an engine temperature is less than the first engine temperature. The engine system further comprises additional controller instructions for opening a compressor bypass valve in response to an intake manifold pressure. The engine system further comprises additional controller instructions for opening a wastegate or adjusting a position of a vane of a turbine in response to the intake manifold pressure. The engine system further comprises additional controller instructions for retarding fuel injection timing at an engine temperature less than the first engine temperature.

Referring now to FIG. 3, signals of interest during a first engine starting sequence is shown. The illustrated signals may be provided via executing instructions of the method of FIG. 5 in controller 12 of FIG. 1.

The first plot from the top of FIG. 3 represents an engine speed. The engine speed may be sensed via a crankshaft sensor or via another known method. The X axis represents time and time increases from right to left. The Y axis represents engine speed and engine speed increases in the direction of the Y-axis arrow.

The second plot from the top of FIG. 3 represents engine intake manifold pressure (MAP). The X axis represents time and time increases from right to left. Intake manifold pressure may be sensed via a pressure sensor and intake manifold pressure increases in the direction of the Y axis arrow.

The third plot from the top of FIG. 3 represents engine EGR amount as a percentage of cylinder charge. The amount of engine EGR may be adjusted via varying a position of an EGR valve. The X axis represents time and time increases from right to left. The Y axis represents engine EGR amount as a percentage of cylinder charge and EGR amount increases in the direction of the Y-axis arrow.

The fourth plot from the top of FIG. 3 represents engine combustion phase (e.g., location of peak cylinder pressure). The combustion phase may be varied by adjusting fuel injection timing, engine EGR amount, boost amount, and air-fuel mixture temperature. The X axis represents time and time increases from right to left. The Y axis represents engine combustion phase and combustion phase advances in the direction of the Y-axis arrow.

The fifth plot from the top of FIG. 3 represents turbocharger wastegate position. The wastegate allows engine exhaust gases to bypass the turbocharger when the wastegate is open. The X axis represents time and time increases from right to left. The Y axis represents wastegate position and the wastegate opens further in the direction of the Y-axis arrow.

The sixth plot from the top of FIG. 3 represents turbocharger compressor bypass valve (CBV) position. The CBV allows compressed air to be directed from the outlet of the compressor (e.g., 162 of FIG. 1) to the inlet of the compressor when the CBV is open. The X axis represents time and time increases from right to left. The Y axis represents CBV position and the CBV opens further in the direction of the Y-axis arrow.

The seventh plot from the top of FIG. 3 represents energy supplied to glow plug and the glow plug tip temperature increases as the amount of energy supplied to the glow plug increases. The X axis represents time and time increases from right to left. The Y axis represents electrical energy supplied to the glow plug and the electrical energy increases in a direction of the Y axis arrow.

The eighth plot from the top of FIG. 3 represents catalyst temperature. The X axis represents time and time increases from the right to left side of the plot. The Y axis represents catalyst temperature and catalyst temperature increases in the direction of the Y axis arrow. Horizontal line 202 represents a catalyst light off temperature.

At time $T_0$, engine speed is zero. Accordingly, MAP is at atmospheric pressure, EGR amount is zero, combustion phasing is at zero, wastegate position is closed, compressor bypass valve is closed, and catalyst temperature is low. The glow plug is activated in preparation for engine starting.

Between time $T_0$ and time $T_1$, the engine is cranked allowing the engine to run up to idle speed beginning at time $T_1$. In some examples, the turbocharger wastegate or turbine vane position may be adjusted during engine cranking as indicated by the dotted line in the fifth plot from the top of FIG. 3. The compressor bypass valve position may also be adjusted between time $T_0$ and time $T_1$ in some examples.

Between time $T_1$ and time $T_2$, the engine speed runs up to idle speed and MAP decreases as intake manifold pressure decreases. MAP may decrease as shown when an air inlet throttle is at least partially closed. In other examples, MAP may be reduced after engine speed reaches idle speed via closing an air intake throttle. The glow plug energy is reduced between time $T_1$ and time $T_2$. The glow plug energy may be reduced in response to engine speed or MAP. Since engine speed and MAP may be indicators of a started engine, the amount of energy supplied to the glow plug may be reduced when idle speed is reached. The combustion phase also changes to a more advanced timing indicating combustion in engine cylinders. The EGR amount is low because little exhaust has exited the engine. In some examples, The EGR valve may be closed during cranking and until idle speed is reached by the engine so that the possibility of engine misfires may be reduced.

At time $T_2$, the engine reaches idle speed and additional actions are taken to increase engine exhaust gas temperature. In particular, the EGR valve is opened further and combustion phasing is retarded via retarding timing of start of injection with respect to engine crankshaft position and the diluted air-fuel mixture. Further, the turbocharger wastegate is opened as is the CBV. Opening the wastegate reduces the amount of exhaust energy transferred to the turbocharger turbine. As such, additional exhaust heat is available to a catalyst in the exhaust of the engine. In addition, since less exhaust energy is delivered to the turbine the compressor tends to compress less air so that intake manifold pressure may be reduced. In systems where turbocharger vanes are adjustable, the vanes are positioned such that less exhaust energy is imparted to the turbine. In one example the vanes may be set to a minimum position. The compressor bypass valve is also opened between time $T_1$ and $T_2$. By opening the CBV any air pressure that may develop from a rotating compressor can be rerouted back to the compressor inlet so that the pressure drop across a throttle body positioned upstream of the compressor may be reduced, thereby reducing air flow into the engine and MAP. The energy supplied to the glow plug remains substantially constant until the engine EGR amount increases. In one example, the amount of energy supplied to the glow plug is responsive to the engine EGR amount or percentage of cylinder charge. The catalyst temperature is low but increases with ensuing combustion.

Between time $T_2$ and time $T_3$, engine speed remains substantially constant as catalyst and engine temperature rise. MAP is reduced since engine run up and it remains low so as to help retard combustion phasing. The EGR amount increases after engine run up and then plateaus before eventually being decreased as time $T_3$ is approached. The engine EGR amount at idle when the catalyst is cold is a higher percentage of cylinder charge mixture as compared to when the engine is idling and the catalyst has reached a light off temperature. In one example, the additional EGR may be tolerated via loading the engine via an electric motor at idle speed. The combustion phase is shown being retarded significantly between time $T_2$ and time $T_3$ so that additional heat from combustion is directed to the engine exhaust system rather than to produce additional mechanical energy. The wastegate and CBV remain in open positions to reduce MAP and allow additional combustion phase retard. The amount of energy supplied to the glow plug is increased as the percentage of EGR supplied to the engine increases. The catalyst temperature begins to increase as additional energy is supplied to the catalyst via the engine cylinders.

At time $T_3$, the catalyst reaches a light off temperature and engine speed is reduced to lower fuel consumption. MAP is also allowed to increase and the wastegate and CBV valves are closed in response to the catalyst reaching a light off temperature. Similarly, the electrical energy supplied to the glow plug is reduced to zero. The combustion phase is also advanced by advancing fuel injection start of injection timing relative to engine crankshaft position. The engine EGR amount gradually decreases as the EGR valve is closed and the engine pumps EGR from the engine intake manifold.

In this way, the engine and catalyst are warmed up to operating temperature and then transitioned from a catalyst warming mode to a nominal operating mode. The actions shown in FIG. 3 can reduce catalyst heating time and may reduce engine emissions.

Referring now to FIG. 4, a second engine starting sequence is illustrated. The sequence of FIG. 4 includes the same signals of interest as described for FIG. 3. As such, the description of each plot is omitted for the sake of brevity and the differences in the sequence are described.

At time $T_0$, the engine is stopped and MAP is at atmospheric pressure. In addition, no electrical energy is supplied to the glow plug and the wastegate and the CBV are closed in response to catalyst and/or engine temperature. The catalyst temperature is shown above the catalyst light off temperature as well.

At time $T_1$, the engine is cranked but the engine EGR percentage, CBV, wastegate position, and glow plug state remain unchanged. Between time $T_1$ and time $T_2$ the engine speed runs up and the engine starts. MAP is reduced somewhat but the remaining signals remain substantially unchanged.

At time $T_2$, the engine idle speed stabilizes at idle speed and the engine operates without changes to the remaining signals. Between time $T_2$ and $T_3$ the combustion phasing is slightly retarded. The combustion phase may be retarded via retarding fuel injection timing relative to engine crankshaft position. The combustion phase may be retarded in this mode to increase heat supplied to the catalyst to a lesser extent than illustrated in FIG. 3.

At time $T_3$, the engine idle speed is reduced. The engine speed may be reduced via reducing the amount of fuel supplied to engine cylinders. In one example, the engine idle speed may be elevated for a brief time after engine start based on a time since start timer. The engine proceeds to idle after the idle speed is reduced.

Thus, FIG. 4 shows that the engine may be operated with a lower EGR percentage of cylinder mixture as compared to engine operation shown in FIG. 3. Since the catalyst and engine are warm in the engine start of FIG. 4, it may be desirable to operate at a lower EGR percentage of cylinder mixture. In this way, engine efficiency can be improved at warmer engine temperatures.

With regard to engine idle speed as shown in FIGS. 3 and 4, in one example, an engine idle speed may be a speed that the engine operates absent a torque input from the engine operator. Further, the engine idle speed may be adjusted by a controller such that the engine idle speed varies for different engine idle conditions.

Referring now to FIG. 5, a flowchart of an example method for starting an engine is shown. The method of FIG. 5 may be executed via instructions of a controller as shown in FIG. 1.

At 502, method 500 judges whether or not an engine temperature is less than a threshold temperature. In one example, the engine temperature may be a catalyst temperature and the threshold temperature may be a catalyst light off temperature. In other examples, the engine temperature may be an engine coolant temperature. Thus, engine temperature may be one of many available temperatures of an engine. If engine temperature is less than a threshold method 500 proceeds to 504. Otherwise, method 500 proceeds to 522.

At 504, method 500 adjusts engine speed and load. In one example, engine speed may be controlled via an amount of fuel supplied to the engine. In other examples, engine speed may be controlled via engine fuel amount and engine air amount. In still other examples, engine speed may be adjusted via spark timing. Where the engine is coupled with an electric motor in a hybrid vehicle engine speed and load may be adjusted via controlling a speed and a load of an electric motor coupled to the engine. For example, the engine speed controller may adjust engine speed to a desired cold idle speed of 1300 RPM while an electric motor provides a load of 25 N-M to increase the load of the engine. Thus, to keep the engine rotating at 1500 RPM, the engine controller may have to adjust an amount of fuel supplied to the engine to overcome the 25 N-M imposed by the electric motor. In one example, the engine speed and load are adjusted according to a table that may be indexed via engine temperature and time since engine start. Method 500 proceeds to 506 after engine speed and load are revised.

At 506, method 500 reduces engine MAP. MAP may be reduced via throttling air entering the engine, opening a CBV, and opening a turbocharger wastegate. For systems that include variable geometry turbochargers the vanes can be positioned such that force imparted to the turbine via exhaust gases is reduced as compared to when the turbine vanes are positioned to most efficiently transfer exhaust gas energy to rotational energy of the turbine. In some examples, where the CBV position is adjustable to a plurality of positions, the CBV may be partially opened. In other examples, the CBV may be simply opened to an open state. Opening the CBV can help to lower MAP by reducing a pressure drop across an engine throttle body, thereby reducing air flow through the throttle body and decreasing MAP. Method 500 proceeds to 508 after MAP is reduced.

At 508, method 500 adjusts engine combustion phase. Combustion phase may be adjusted via retarding start of fuel injection timing. Further, increasing cylinder charge dilution by increasing engine EGR can also retard engine combustion phasing. And, engine combustion phasing can be adjusted via adjusting the cylinder charge temperature. In some examples, fuel injection timing during a cylinder cycle after combustion is initiated in the cylinder cycle may also be adjusted. For example, after a cylinder begins to combust an air-fuel mixture, the start of fuel injection timing for fuel injection events after the combustion is initiated may be adjusted. In one example, post combustion fuel injection can be retarded from 55 crankshaft degrees after top dead center compression stroke to 60 crankshaft degrees after top dead center compression stroke. Method 508 proceeds to 510 after engine combustion phase is retarded.

At 510, method 500 adjusts the percentage of EGR in engine cylinders via opening an EGR valve. The EGR percentage of engine cylinder mixtures is increased to a level above engine idle conditions when the engine and catalyst are warm. The additional EGR can help to further retard engine combustion phasing so that additional heat is delivered to the engine exhaust system. EGR percentage of cylinder mixture may also be increased via increasing intake and exhaust valve overlap time. In one example, the EGR percentage is adjusted in response to catalyst temperature and/or other engine temperatures. For example, the EGR percentage of cylinder mixture can be 35% during cold idle conditions and 25% during warm idle conditions. The EGR valve may be opened to a more open position during cold idle conditions as compared to warm idle conditions so as to increase the EGR flow rate to engine cylinders during cold idle conditions. Method 500 proceeds to 512 after engine EGR is adjusted.

At 512, method 500 operates engine glow plugs. Engine glow plugs may continue to receive electrical power after the engine is started so as to promote combustion stability. In one example, glow plugs receive a first amount of electrical power before or during engine cranking and then a second amount of electrical power, lower than the first amount of electrical power after the engine reaches idle speed. The electrical power controls the tip temperature of the glow plug. In one example, the amount of electrical power supplied to the glow plug may be responsive to the percentage of EGR in the engine cylinder mixture. Thus, the amount of energy supplied to the glow plug follows the percentage of EGR in the cylinder mixture. Method 500 proceeds to 514 after glow plug operation is updated.

Further, engine speed and load may be increased as engine temperature is reduced via a hybrid motor coupled to the engine to promote combustion stability and increase the engine's tolerance to EGR and combustion phase timing retard.

At 514, method 500 judges whether or not there is an increase in engine torque via an operator or an external system (e.g., a power take off device). If so, method 500 proceeds to 516. Otherwise, method 500 returns to 502.

At 516, method 500 judges whether or not battery charge is greater than a threshold level. If so, method 500 proceeds to 524. Otherwise, method 500 proceeds to 518. Method 500 assesses battery state of charge so that it can be determined whether or not a desired amount of torque can be provided via an electric motor coupled to the engine so that the catalyst may be warmed more rapidly. In particular, operation of the engine may not be adjusted to increase engine torque when the driver requested torque can be provided via an electric motor. If the driver demanded torque cannot be delivered solely via the electric motor, the torque of the motor and the engine may be combined to provide the desired level of torque.

At 524, method 500 adjusts output of a hybrid motor (e.g., electrical or hydraulic) to provide increased torque to vehicle wheels. By increasing torque of the hybrid motor it may be possible to convert an increased amount of combustion energy from the engine into heat so as to more rapidly warm a catalyst in the engine exhaust system. In one example, the driver demand torque is provided to the vehicle wheels solely via the hybrid motor until the driver demand torque exceeds the torque capacity of the hybrid motor. Thereafter, the driver demand torque is provided by both the hybrid motor and the engine.

At 518, method 500 increases MAP so that the additional requested torque can be provided by the engine and so that engine efficiency can be increased during higher load conditions. The mass flow rate of the engine may also increase during conditions of higher load so that catalyst heating may continue even though combustion phasing may be advanced to provide the requested engine torque. In one example, the amount of MAP increase is proportional to the requested increase in engine torque. MAP can be increased by closing the CBV, wastegate, or positioning turbine vanes to increase the amount of exhaust energy imparted from the exhaust gases to the turbine. Method 500 proceeds to 520 after MAP is increased.

At 520, method 500 decreases the percentage of EGR supplied to the cylinders so that stable combustion may be provided at the higher requested torque or load. However, in some examples where the percentage of EGR based on the operator request is higher than the idle EGR percentage of the cylinder mixture, the EGR percentage may be increased. In one example, the amount of EGR reduction is proportional to the requested increase in engine torque. The amount of EGR can be decreased by at least partially closing the EGR valve and/or reducing the intake valve and exhaust valve overlap. Method 500 proceeds to 522 after engine EGR percentage of the cylinder mixture is reduced.

At 522, method 500 advances combustion phasing of the engine so that the requested torque may be provided more efficiently. Further, since operating the engine at a higher torque level may increase exhaust gas temperatures, combustion phasing retard may be reduced without lowering the amount of thermal energy supplied to the engine exhaust. The combustion phasing may be advance via advancing fuel injection timing relative to engine crankshaft position. Further, reducing the EGR percentage of cylinder mixtures can also advance combustion phasing. In one example, the amount of combustion phase advance is proportional to the requested increase in engine torque. Method 500 returns to 514 after combustion phase is advanced.

Thus, after a cold start when there is an absence of an operator or external torque request, engine combustion phasing can be retarded, EGR can be increased, and MAP may be reduced to reduce catalyst light off time. However, if there is an external torque request, combustion phasing, EGR, and MAP can be adjusted to provide the desired engine torque while still reducing catalyst light off time.

At 522, method 500 adjusts engine speed and load to provide more efficient engine operation. Since the engine or catalyst temperature is greater than the threshold temperature, the thermal output of the engine can be reduced. In one example, the engine idle speed is lowered and the engine mass air flow rate is lowered when engine temperature is greater than a threshold.

At 524, method 500 adjusts combustion phasing. In particular, combustion phasing can be advanced so that additional energy is converted to mechanical work rather than thermal energy. Combustion phasing may be adjusted via advancing start of fuel injection timing. Further, combustion phasing can be advanced via decreasing the percentage of EGR in cylinder mixtures. Method 500 proceeds to 526 after adjusting combustion phasing.

At 526, method 500 adjusts the engine EGR percentage of cylinder mixtures. In one example, the EGR percentage of cylinder mixture is adjusted by at least partially closing an EGR valve. Closing the EGR valve can reduce the EGR percentage of cylinder mixture. Closing or partially closing the EGR valve may allow the engine to operate at a lower engine load with improve combustion stability. The EGR valve can be closed further during warm engine idle conditions as compared to the position of the EGR valve during cold engine idle conditions. In this way, fuel consumed by the engine may be reduced after the engine and/or catalyst reach the threshold operating temperature. Thus, the warm engine idle EGR amount and the warm engine cylinder air charge are less than the cold engine idle EGR amount and the cold engine cylinder air charge, the warm engine idle EGR amount reduced by a proportionally greater amount from the cold engine idle EGR amount as the warm engine idle cylinder air charge is reduced from the cold engine idle cylinder air charge. Method 500 proceeds to 528 after the engine EGR is adjusted.

At 528, the engine glow plug is deactivated. The engine glow plug may be deactivated via stopping current flow to the glow plug. Since the engine and catalyst have reached operating temperature, the engine can be operated with injection timings and EGR amounts that provide stable combustion at lower engine idle speeds. Method 500 proceeds to exit after the glow plugs are deactivated.

Thus, the method of FIG. 5 provides for a method, comprising: operating an engine at idle conditions with a first EGR percent concentration at an engine temperature less than a first engine temperature; and operating the engine at idle conditions with a second EGR percent concentration at an engine temperature greater than the first engine temperature, the second EGR percent concentration less than the first EGR percent concentration. In one example, the method further comprising increasing a load of the engine at the engine temperature less than the first engine temperature via an electric machine. The method includes where a speed of the engine at the engine temperature less than the first engine temperature is higher than the speed of the engine at the engine temperature greater than the first engine temperature. The method also includes where a glow plug is activated and deactivated responsive to EGR percentage or engine exhaust temperature. In one example, the method further comprises retarding fuel injection timing (e.g., start of injection time and/end of injection time) at the engine temperature less than the first engine temperature. The engine operating further comprises injecting fuel to a cylinder during a cycle of the cylinder after ignition in the cylinder during the cycle of the cylinder. In another example, the method further comprises decreasing the first EGR percent concentration in response to an increasing torque request. The method further comprises reducing the first EGR percent concentration as a catalyst temperature increases.

In another example, FIG. 5 provides for a method, comprising: operating an engine at idle conditions with a first cylinder air charge and a first cylinder EGR amount at an engine temperature less than a first engine temperature; operating the engine at idle conditions with a second cylinder air charge and a second cylinder EGR amount at an engine temperature greater than the first engine temperature, the second EGR amount and the second cylinder air charge less than the first EGR amount and the first cylinder air charge, the second EGR amount reduced by a proportionally greater amount from the first EGR amount as the second cylinder air charge is reduced from the first cylinder air charge; and lowering an intake manifold pressure via opening a compressor bypass valve. The method further comprises lowering the intake manifold pressure via adjusting a position of a turbine vane or via adjusting a position of a wastegate. The method further comprises decreasing the first EGR percent concentration in response to an increasing torque request. The method further comprises reducing the first EGR percent concentration as a catalyst temperature increases. The method includes where the compressor bypass valve is partially opened. The method includes where the compressor bypass valve is opened in response to intake manifold pressure.

As will be appreciated by one of ordinary skill in the art, the method described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps, methods, or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method, comprising:
   operating an engine at idle conditions with a first EGR percent concentration of cylinder charge with an open compressor bypass valve when engine temperature is less than a first temperature; and
   operating the engine at idle conditions with a second EGR percent concentration of cylinder charge, less than the first EGR percent concentration, with a closed compressor bypass valve when engine temperature is greater than the first temperature.

2. The engine operating method of claim 1, further comprising increasing a load of the engine at the engine temperature less than the first engine temperature via an electric machine.

3. The engine operating method of claim 1, where a speed of the engine at the engine temperature less than the first engine temperature is higher than the speed of the engine at the engine temperature greater than the first engine temperature.

4. The engine operating method of claim 1, where a glow plug is activated and deactivated responsive to EGR percentage or engine exhaust temp.

5. The engine operating method of claim 1, further comprising retarding fuel injection timing at the engine temperature less than the first engine temperature.

6. The engine operating method of claim 1, further comprising injecting fuel to a cylinder during a cycle of the cylinder after ignition in the cylinder during the cycle of the cylinder.

7. The engine operating method of claim 1, further comprising decreasing the first EGR percent concentration in response to an increasing torque request.

8. The engine operating method of claim 1, further comprising reducing the first EGR percent concentration as a catalyst temperature increases.

9. A method, comprising:
operating an engine at idle conditions with a first EGR percent concentration of cylinder charge with an open turbocharger wastegate when engine temperature is less than a first temperature; and
operating the engine at idle conditions with a second EGR percent concentration of cylinder charge, less than the first EGR percent concentration, with a closed turbocharger wastegate when engine temperature is greater than the first temperature.

10. The engine operating method of claim 9, further comprising increasing a load of the engine at the engine temperature less than the first engine temperature via an electric machine.

11. The engine operating method of claim 9, where a speed of the engine at the engine temperature less than the first engine temperature is higher than the speed of the engine at the engine temperature greater than the first engine temperature.

12. The engine operating method of claim 9, where a glow plug is activated and deactivated responsive to EGR percentage or engine exhaust temp.

13. The engine operating method of claim 9, further comprising retarding fuel injection timing at the engine temperature less than the first engine temperature.

14. The engine operating method of claim 9, further comprising injecting fuel to a cylinder during a cycle of the cylinder after ignition in the cylinder during the cycle of the cylinder.

15. The engine operating method of claim 9, further comprising decreasing the first EGR percent concentration in response to an increasing torque request.

16. The engine operating method of claim 9, further comprising reducing the first EGR percent concentration as a catalyst temperature increases.

17. A method, comprising:
operating an engine at idle with a first EGR percent concentration of cylinder charge with an open turbocharger wastegate and compressor bypass valve when engine temperature is less than a threshold; and
operating the engine at idle with a second EGR percent concentration of cylinder charge, less than the first EGR percent concentration, with a closed turbocharger wastegate valve and compressor bypass valve when engine temperature is greater than the threshold.

* * * * *